May 4, 1965     H. SCHMID     3,182,292
NOISE-REJECTING COUNTER CIRCUIT
Filed June 29, 1961     4 Sheets-Sheet 1

HERMANN SCHMID
INVENTOR

BY *Richard G. Stephens*
ATTORNEY

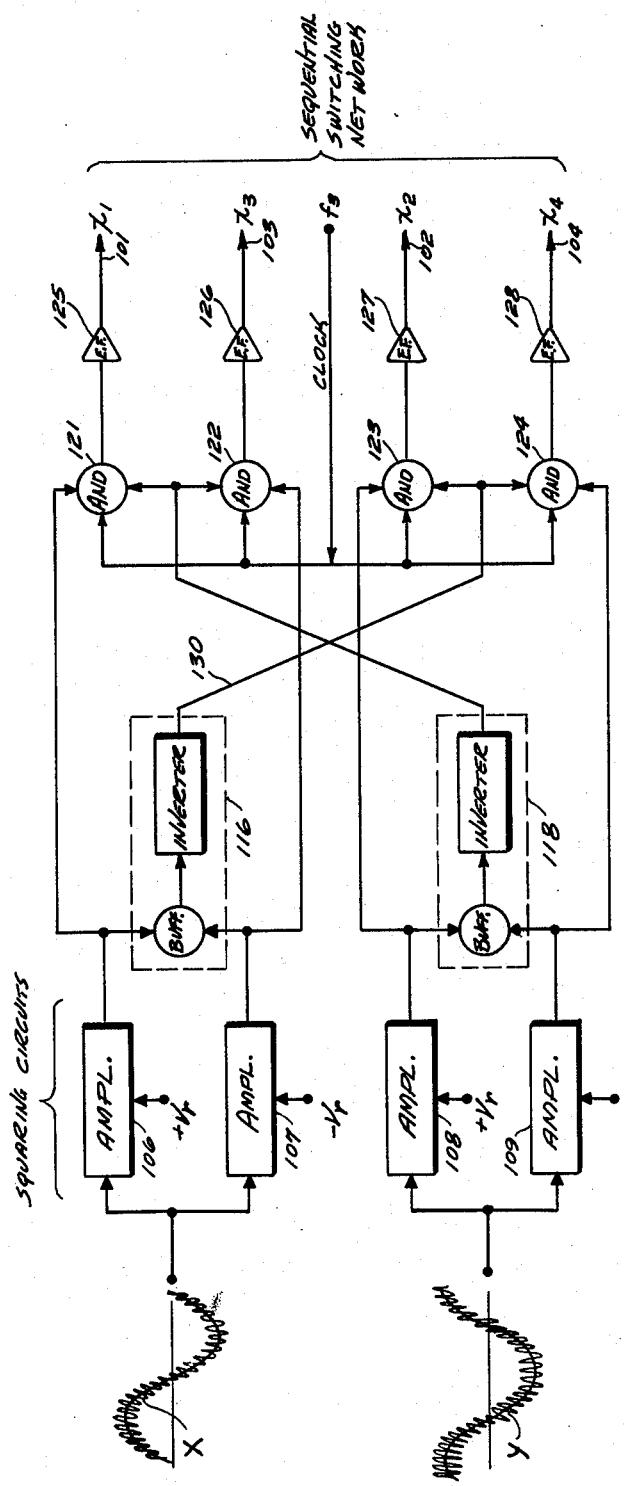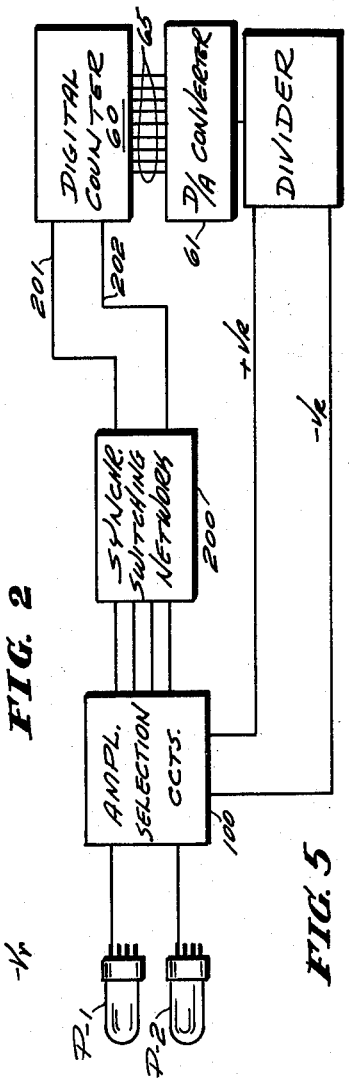

May 4, 1965        H. SCHMID        3,182,292

NOISE-REJECTING COUNTER CIRCUIT

Filed June 29, 1961        4 Sheets-Sheet 4

HERMANN SCHMID
INVENTOR

BY Richard D. Stephens
ATTORNEY

United States Patent Office 3,182,292
Patented May 4, 1965

3,182,292
NOISE-REJECTING COUNTER CIRCUIT
Hermann Schmid, Binghamton, N.Y., assignor to Link Division of General Precision, Inc., Binghamton, N.Y., a corporation of Delaware
Filed June 29, 1961, Ser. No. 120,709
15 Claims. (Cl. 340—170)

This invention relates to correlators, and more particularly, to a phase-discriminating noise rejection circuit employing digital logic. In the communications, computer, automatic control and instrumentation arts the use of pairs of phase-related signals to represent various conditions is very common. For example, received radio signals which result from controlled transmitted signals may be arranged to be ignored and rejected as "noise" unless they have specified phase relationships to the transmitted signals, thereby making the communications system far less susceptible to error in the presence of a noise-causing environment. Other examples are numerous.

A number of known devices use pairs of phase-related (frequently quadrature) voltages to represent physical quantities, with the phase angle between the two signals representing direction. For example, the interferometric micrometer shown in U.S. Pat. No. 2,977,841, granted April 4, 1961, to John Kaufmann and Woodrow Hayes, derives two 90 degree phase displaced, approximately sinusoidal voltages from an interferometer as a measuring head is moved, to operate a digital counter, which counts the number of cycles through which the voltages vary, to indicate the number of light wavelengths i.e., the distance, that the measuring head has been moved. The use of two phase-displaced signals is necessary in order to determine direction accurately. While this very precise measurement arrangement finds wide application, the maximum allowable distance over which such an interferometer will operate reliably is undesirably limited. The interference "fringes" viewed by photo-detectors in such an arrangement become indistinct and difficult to discriminate from noise, especially photodetector noise, as measurement distance is increased. The present invention, by rejecting noise, permits operation of such an interferometer over greater distances or in the face of worsened noise conditions without loss of accuracy. While the invention is described in a bi-directional interferometric micrometer environment, where it is especially useful, and while it obviously will be useful in Moire fringe apparatus and equivalent light-operated devices, it is important to recognize that it has much wider application, in a large number of systems where two or more phase-displaced signals are used coherently.

Thus, it is a primary object of the present invention to provide an improved, more noise-free electronic counting arrangement useful for counting transitions of a pair of phase-displaced electrical signals having a phase relationship which designates counting direction.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 2 is an electrical schematic diagram, partially in block form, of an exemplary digitizing or amplitude selection portion of the invention;

FIG. 5 is an electrical schematic diagram, partially in block form, of an alternative arrangement for deriving the variable noise-rejection threshold signal;

Figure 1:
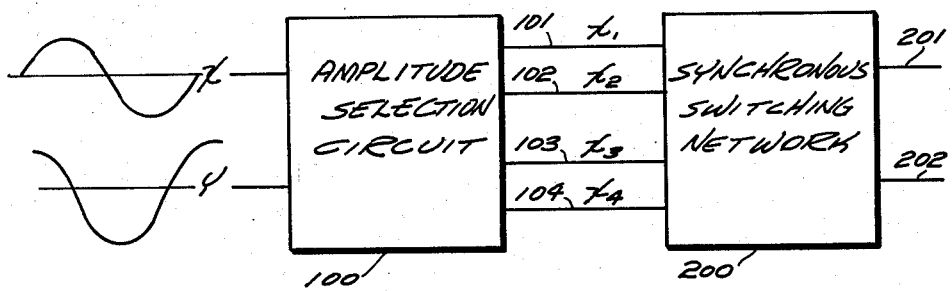
FIG. 1 is a simplified block diagram of electronic portions of the invention.

The matter of non-ambiguous bi-directional counting by means of the invention may better be understood by reference to FIG. 1 where two "noisy" sine wave signals X and Y are shown connected to amplitude-selection circuits shown in block form at 100. The amplitude-selection circuits 100 must produce properly at respective times, four signals which comprise the inputs to a synchronous switching network shown in block form at 200. The synchronous switching network must provide as outputs at appropriate times, one "count up" signal, as on line 201, and one "count down" signal, as on line 202, to operate a counter (not shown). A "count up" or "add" signal should appear if and only if the X and Y sine waves have traversed through one complete cycle with X leading Y by 90 degrees. Conversely, a "count down" or "subtract" signal should appear on line 202 if and only if X and Y have traversed through 360 degrees with X lagging behind Y. When the two sine waves X and Y traverse through 360 degrees, the outputs (101–104) of the amplitude selection circuits 100 must be energized one at a time in ascending sequence when X leads Y and energized one at a time in descending sequence when X lags Y.

As shown in the more detailed block diagram of FIG. 2, the input sine waves X and Y, each with "noise" modulated thereon, are connected to respective pairs of limiting or blocking amplifiers, all of conventional construction. For example, the X input signal is applied to amplifiers 106 and 107, and the Y input signal is applied to amplifiers 108 and 109. Amplifier 106 will provide a negative (with respect to ground) output whenever the X voltage exceeds (i.e., is more positive than) the reference voltage $V_r$ and a positive voltage when X is less (i.e., more negative) than $V_r$. Amplifier 107 provides a negative output whenever the X voltage is more negative than $-V_r$. The quantity $V_r$ is a variable controlled in a manner to be described below. The output voltages from amplifiers 106, 107 are applied through a buffer and inverting means shown within dashed lines at 116. The buffer also provides an "OR" switching function. An output, i.e., a "1," will be present at conductor 130 whenever, and only whenever, the X sine wave value lies in between $+V_r$ and $-V_r$. In similar fashion, the outputs of amplifiers 108 and 109 are buffered and inverted at 118 to provide a signal present whenever, and only whenever, the Y sine wave value lies in between $+V_r$ and $-V_r$.

The $X_1$ output on line 101 and the $X_3$ output on line 103 from the amplitude selection circuits are obtained by cross-correlating the amplifier 106 and 107 output signals with the output signal from inverter 118, by applying the signals as shown to coincidence, or "and" gates 121 and 122. Similarly, the $X_2$ output on line 102 and the $X_4$ output on line 104 from the amplitude selection circuits are obtained by cross-correlating the amplifier 108 and 109 output signals with the output signal from inverter 116, by applying the signals as shown to "and" gates 123 and 124. Coincidence gates 121–124 each may be provided with three input lines, all three of which input lines must be energized to provide an output from any given gate. The third input line to each of the four "and" gates may be supplied with a clock pulse from a conventional clock pulse source at $f_3$ (not shown). The output signals from the "and" gates are shown applied through buffers, such as emitter followers 125–128. The provision of a third input line and use of a clock pulse at each "and" gate enables one to obtain output pulses having short rise times even when the X and Y input sine waves change very slowly. It will be apparent that such sharp pulses will operate the counter or other utilization circuit in a more reliable and unambiguous manner.

The clock pulse signals usually are applied many times during each cycle of the applied X and Y voltages, so that an output signal will appear on a given one of output lines 101–104 many times during a single cycle of the X and Y voltages. Because the switching network 200 requires either of two defined sequences of pulses in order to provide add or subtract pulses on lines 201 and 202, the repetition many times of an input signal on the same output line (of lines 101–104) during many clock pulses does not cause pulses to occur repeatedly on either line 201 or line 202. The use of clock pulses is beneficial especially where the X and Y input signals may be of very low frequency. Where the input signals change rapidly enough no clock pulse is usually necessary or desirable.

In order to afford accurate operation during widely varying conditions, the bias or comparison quantity $V_r$ is maintained at approximately 0.5 to 0.8 of the sine wave signal amplitude, and hence as the input signal amplitude decreases, the signal-to-noise ratio decreases, the reference or bias voltages applied to amplifiers 106–109 are varied. In the case of an interferometer, the sine wave signals developed by the photodetectors diminish in amplitude and the input signal-to-noise ratio decreases as optical path length increases.

The reference voltage $+V_r$ and $-V_r$ may be provided in several basically different ways in different embodiments of the invention. Where one may measure or detect a system parameter or plurality of parameters chiefly by determining input signal amplitude, voltage-modifying means may be controlled in accordance with the measured or detected value or values of said one or more parameters. For example, in the case of the interferometer discussed above, sine wave amplitude varies fairly directly in accordance with optical path length, so that a potentiometer or similar means attached to the interferometer measuring head may be used to provide a variable reference voltage inversely proportional to optical path distance. If the system were such that photo-detector supply voltage, for example, also affected sine wave signal amplitude, the supply voltage also may be made to vary the $V_r$ quantity. In applications where the count in a following counter always will be an acceptable measure of instantaneous optical path length, or probable noise factor, the $V_r$ threshold quantity may be provided by digital-to-analog conversion of the number in the counter, and inversion, or division, of the converted number, to provide a signal which varies as an inverse function of optical path distance. An additional possible technique for deriving a suitable threshold voltage involves measuring the amplitudes of the input X and Y signals and deriving a smoothed $V_r$ potential commensurate with a desired fraction of their effective values.

Figure 3:
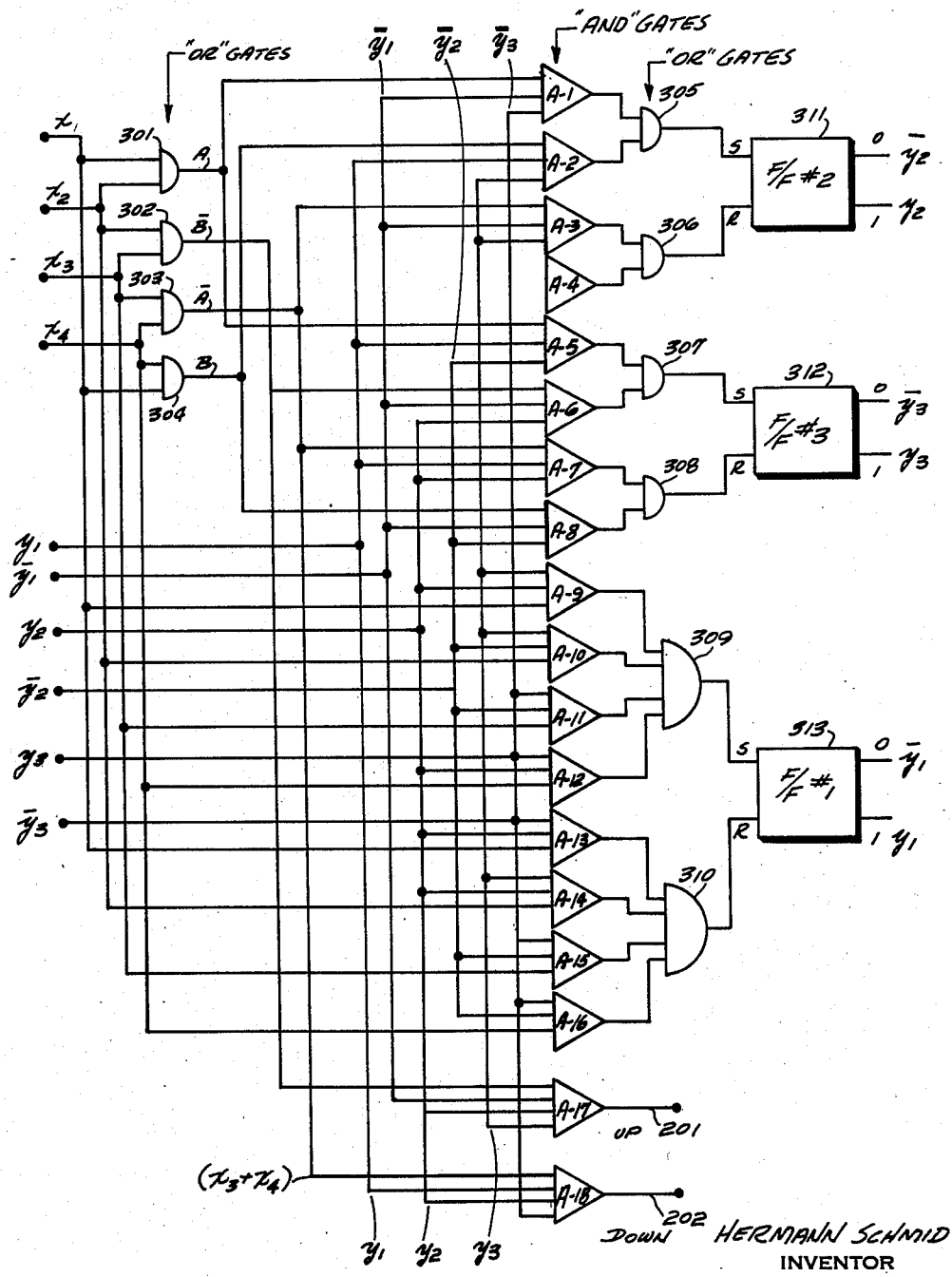
FIG. 3 is an electrical schematic diagram of an exemplary synchronous switching network connected according to the invention.

The $X_1$, $X_2$, $X_3$ and $X_4$ signals are inputs to the synchronous sequential switching circuit 200, which is a digital logic circuit. It will produce an "up" pulse on output line 201 for every $X_1$ input if and only if the input sequence $X_1$, $X_2$, $X_3$, $X_4$ has just occurred. Similarly, it will provide a "down" pulse on line 202 for every $X_4$ pulse if and only if the input sequence $X_4$, $X_3$, $X_2$, $X_1$, has just occurred. For all other input sequences there should be no output signal. The system is shown in FIG. 3 as comprising eighteen "and" gates, ten "or" gates and three triggers, or bi-stable circuits. By energizing the $X_1$, $X_2$, $X_3$, $X_4$ inputs in various sequences the state of the flip flops may be changed, but only for the two specified input sequences will output signals be provided on line 201 or on line 202. As shown in FIG. 3, the four $X_1$ thru $X_4$ inputs from the amplitude selection circuits 100 each are connected as one input to two "or" gates and to two "and" gates. For example, the $X_1$ input is connected to "or" gates 301 and 304 and to "and" gates A-9 and A-13. "And" gates A-1 through A-16 are "three input line" gates while "and" gates A-17 and A-18 are "four input line" gates. The sixteen "and" gates A-1 to A-16 are connected as shown in adjacent pairs to actuate four "two input line" "or" gates 305 to 308 individual to the pairs. For example, "and" gates A-1 and A-2 are connected to provide inputs to "or" gate 305, so that an output will be provided from "or" gate 305 upon occurrence of an output signal from either gate A-1 or gate A-2. "And" gates A-9 through A-12 feed the four input lines of "or" gate 309, and "and" gates A-13 through A-16 feed the four input lines of "or" gate 310. The six "or" gates 305–310 are connected to the "set" and "reset" input lines of flip-flops 311, 312 and 313 to provide pairs of mutually inverse output signals from the three flip-flops. For example, "or" gates 305 and 306 are connected to the "set" and "reset" input lines of flip-flop 311, to provide output signals $\overline{Y}_2$ and $Y_2$. The $Y_1$, $Y_2$ and $Y_3$ signals made available from bistable circuits 311–313, and their inverse signals $\overline{Y}_1$, $\overline{Y}_2$ and $\overline{Y}_3$, all are utilized as input signals to the three input line "and" gates A-1 to A-16 mentioned above and also to the two four-line output "and" gates A-17 and A-18, in the manner shown. For sake of clarity and to minimize the number of crossing lines, the output signals of flip-flops 311–313 are shown present at terminals at the left of FIG. 3, with appropriate connections made evident. The output signal from "and" gate A-17 on line 201 constitutes the "up" signal referred to above, and the signal from "and" gate A-18 on line 202 constitutes the "down" signal previously mentioned. These signals may be applied to operate a variety of counters, indicators and control apparatus (not shown).

The following truth table indicates the operation of the switching network of FIG. 3.

| Initial States | | | Resultant States | | | |
| --- | --- | --- | --- | --- | --- | --- |
| 313 | 311 | 312 | $x_1$ | $x_2$ | $x_3$ | $x_4$ |
| 0 | 0 | 0 | 010 | 010 | 100 | --- |
| 0 | 1 | 0 | --- | 011 | 011 | 110 |
| 0 | 1 | 1 | 111 | --- | 001 | 001 |
| 0 | 0 | 1 | 000 | 101 | --- | 000 |
| 1 | 0 | 0 | 101 | 101 | --- | 000 |
| 1 | 0 | 1 | 111 | --- | 001 | 111 |
| 1 | 1 | 1 | --- | 011 | 110 | 110 |
| 1 | 1 | 0 | 010 | 100 | 100 | --- |

For example, if the three flip-flops all are in their reset or "0" conditions, as indicated by the three zeroes in the first line under "Initial States," the occurrence of an $x_1$ input or of an $x_2$ input will set flip-flop 311 but leave flip-flops 313 and 312 in their reset condition. The occurrence instead of an $x_3$ input would set flip-flop 313 but leave flip-flops 311 and 312 in their reset condition, while still differently, the occurrence of an $x_4$ input would not change anything. The three binary digits in a given $x$ input column under "Resultant States" indicate, from left to right, the resultant states of flip-flops 313, 311 and 312, respectively, after occurrence of an $x$ input pulse of the given type.

Figure 7:
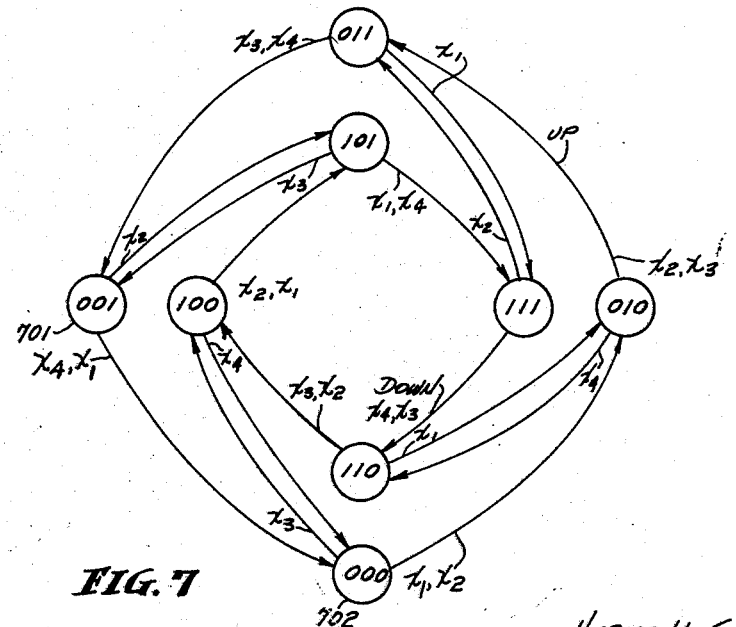
FIG. 7 is a logical state diagram useful in understanding the operation of the switching network 200.

Understanding of the operation of the switching circuit also may be facilitated by reference to the state diagram of FIG. 7. The three flip-flops or memory elements 311–313 of FIG. 3 can exist in eight different states, each one of which is represented by one of the eight circles in FIG. 7. Circle 701 shown at the left of FIG. 7 is labelled 001, meaning that the states of flip-flops 313, 311 and 312 are "0," "0" and "1," or, otherwise stated are, respectively, "reset," "reset" and "set." The arrow leading from circle 701 to circle 702 is labeled "$x_4$, $x_1$" near its rear end, meaning the occurrence of either an $x_4$ input pulse or an $x_1$ input pulse will switch the circuit from its "001" condition to its "000" condition, the latter condition being that of circle 702. Two particular arrows labelled "up" and "down" indicate which changes of state result in output counts to the counter on lines 201 and 202. It will be seen that an "up" count results as the network changes from its "010" state to its "011" state, and that a "down" count will result upon a change from the "111" state to the "110" state.

By straightforward Boolean algebra notation, the following logic equations may be written to describe the operation of the switching circuit of FIG. 3.

$$y_1 = x_1(y_2 y_3) + x_2(\bar{y}_2 y_3) + x_3(\bar{y}_2 \bar{y}_3) + x_4(y_2 \bar{y}_3) \quad (1)$$
$$\bar{y}_1 = x_1(y_2 y_3) + y_2(y_2 y_3) + x_3(\bar{y}_2 y_3) + x_4(\bar{y}_2 \bar{y}_3) \quad (2)$$
$$y_2 = (x_1 + x_2)\bar{y}_1 \bar{y}_3 + (x_1 + x_4) y_1 y_3 \quad (3)$$
$$\bar{y}_2 = (x_3 + x_4)\bar{y}_1 y_3 + (x_2 + x_3) y_1 y_3 \quad (4)$$
$$y_3 = (x_2 + x_3)\bar{y}_1 y_2 + (x_1 + x_4) y_1 y_2 \quad (5)$$
$$\bar{y}_3 = (x_1 + x_4)\bar{y}_1 \bar{y}_2 + (x_3 + x_4) y_1 y_2 \quad (6)$$
$$\bar{y}_1 y_2 \bar{y}_3 (x_2 + x_3) = Z_1 \text{ (an "UP" count)} \quad (7)$$
$$y_1 y_2 y_3 (x_3 + x_4) = Z_2 \text{ (a "DOWN" count)} \quad (8)$$

Equations 1 through 6 describe the operation of "or" gates 305–319 and the three bistable memory elements 311–313. For example, referring to Equation 1, to produce a $y_1$ output signal, which means putting flip-flop 313 in its "set" condition, requires an output from "or" gate 309, and the four terms on the right-hand side of Equation 1 each represent a different one of the four inputs to "or" gate 309 from "and" gates A–9 through A–12. Equations 7 and 8 recite the connections of "and" gates A–17 and A–18, respectively, and "or" gates 301–304. The details per se of switching network 200 are not part of the present invention, but instead are shown and described in "Arithmetic Operations in Digital Computers," by R. K. Richards, published in 1955 by D. Van Nostrand Company, Inc., as well as other standard reference books. Various other switching networks may be substituted for the network of FIG. 3 without departing from the present invention. Rather than separate "up" and "down" input lines some counters use a pulse line and a steering line, and the present invention may be used with an appropriately altered switching network to actuate such a modified type of counter.

Because the probability is very small that the sequence of noise will be proper to operate the counter, it is almost impossible for noise to produce an additional erroneous or extra count. While it is less apparent, it is true that the probability that noise will prevent a legal or proper count also is considerably lessened by the instant invention.

Figure 4:
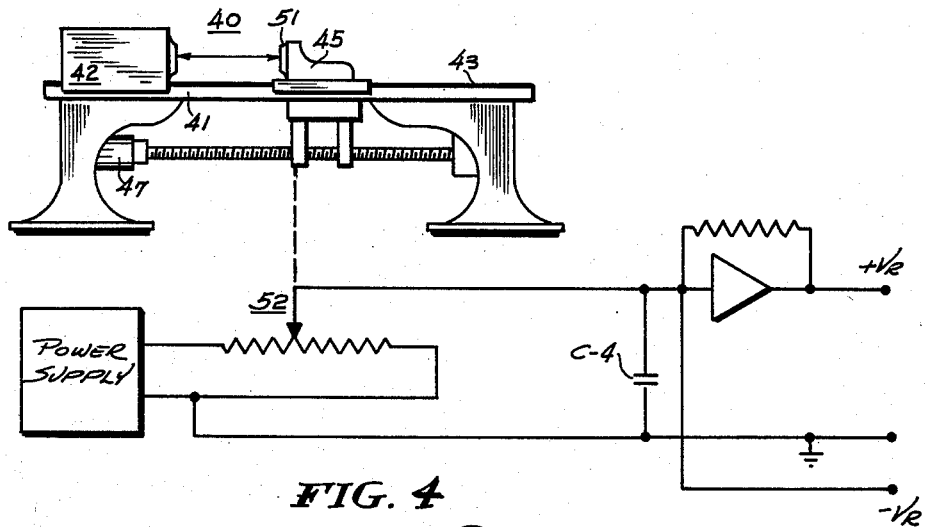
FIG. 4 is an improved automatic length mensuration device incorporating the invention, in which the noise-rejection threshold or probable noise factor signal is determined by sensing the optical path distance of the interferometer which supplies the phase-displaced input signals.

FIG. 4 shows schematically an interferometric linear measurement machine at 40 comprising a bed 41 upon which is fixedly mounted the stationary assembly 42 of the device. Bed 41 also is provided with ways, as shown at 43 upon which a movable measuring head 45 is slidably mounted. Drive motor 47 mounted on bed 41 drives lead screw 48, translating measuring head 45, which carries a cube corner prism retroreflector 51. As fully explained in Pat. No. 2,977,841, a pair of cyclically varying, substantially sinusoidal interference fields or "fringes" are produced as translation of retroreflector 51 varies the optical path distance between reflector 51 and the stationary portion 42 of the device. As the optical path distance increases, light of less intensity operates the interferometer photo-detectors, and smaller signals derived in the presence of substantially constant system noise result in a poorer signal-to-noise ratio. In FIG. 4 the physical motion of the movable portion of the interferometer is sensed by rigidly connecting a displacement-to-electrical signal transducer (shown schematically as comprising a simple potentiometer 52) to the movable 45. The winding of potentiometer 52 is connected to be excited by a voltage from a power supply, preferably regulated, so that movement of measuring head 45 will be seen to vary the output voltage from the arm of potentiometer 52. The voltage will decrease in magnitude as optical path distance of the interferometer increases and signal-to-noise ratio of the input signals decreases. This voltage may be used directly and in inverted form to provide the $+V_r$ and $-V_r$ voltages required to set the variable threshold in FIG. 2. Capacitor C–4 serves to filter out transients caused by the finite resolution of potentiometer 52. A variety of alternative displacement transducers may be substituted without departing from the invention, including, for example, movable core transformers (whose supply will be A.C. and whose output must be rectified), and capacitance-type and photoelectric type displacement transducers.

In the FIG. 5 alternative arrangement, the threshold voltages are shown derived from the output of the system. The count in the digital counter 60 operated by the switching network 200 is applied via conductors 65 to operate a digital-to-analog converter 61 of conventional construction, which provides an output voltage inversely proportional to signal amplitude. A conventional analog divider circuit converts the voltage to a signal proportional to input signal magnitude, and supplies positive and negative $V_r$ signals to the amplitude selection circuits 100, as shown in FIG. 2.

Figure 6:
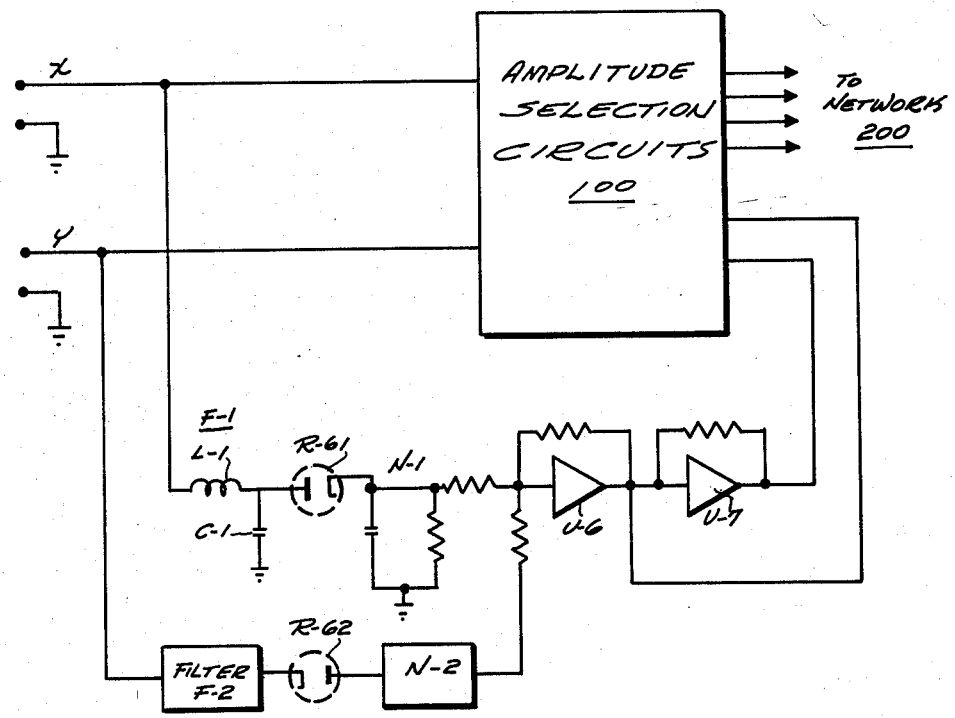
FIG. 6 is an electrical schematic diagram, partially in block form, of a further alternative arrangement useful for deriving the variable probable noise factor signal, particularly where constant frequency periodic input signals are present.

The alternate arrangement in FIG. 6 is useful primarily in systems where the frequency of the input signals does not vary widely, as in the case of interferometers having constant speed measuring heads. The quadrature input signals applied to the digitizing circuits 100 are also applied to separate similar filters F–1 and F–2, one of which is shown as comprising a low-pass LC filter including inductance L–1 and capacitance C–1. If much of the system noise superimposed on the input signals is much higher in frequency than the frequency of the input signals, as is frequently the case, low-pass filters such as F–1 and F–2 serve to eliminate much noise. Where white noise is present, and where the measuring head is intended to operate at substantially a fixed frequency, the use of band-pass filters in lieu of low pass filters may be preferred. Because many applications will involve a wide speed range, and wide changes in the frequency of the quadrature input signals, it frequently will prove desirable to vary the tuning of the filters as the input signal frequency varies. Numerous suitable ways to provide variable filter tuning are available to those skilled in the art. The output signals from the two filters are peak-detected, by means of rectifiers R–61 and R–62 and associated long time constant RC networks N–1 and N–2. The integrating networks have time constants much longer than the period of the input signals. The output signals from the integrating networks N–1 and N–2 are applied via resistors to be averaged by summing amplifier U–6, and inverter U–7 provides the opposite polarity $V_r$ voltage.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Apparatus for receiving two phase-displaced approximately sinusoidal input signals and for providing directional output signals, comprising in combination: a plurality of amplitude selection circuits having four output lines, said amplitude selection circuits being connected to receive said two input signals and operative to provide output signals in a first sequence $X_1$, $X_2$, $X_3$, $X_4$ on said four output lines when a first of said two input signals leads the second of said input signals, and operative to provide output signals in a second sequence $X_4$, $X_3$, $X_2$, $X_1$, opposite to said first sequence on said input signals, when said first of said two input signals lags said second of said input signals; and a synchronous switching network connected to receive the signals on said four output lines, said switching network being operable to provide a pulse on a first output line upon each occurrence of said first sequence of input signals and to provide a pulse on a second output line upon each occurrence of said second sequence of input signals.

2. Measuring apparatus, comprising in combination: means including a movable element and a pair of photoelectric devices for providing a pair of phase-displaced electrical signals which vary periodically as said movable element is moved; a pair of amplitude selection circuits responsive to said phase-displaced electrical signals and to a probable noise factor signal for providing first or second sequences of pulses on a first plurality of terminals depending upon the phase relationship between said phase-displaced electrical signals; a switching network connected to said first plurality of terminals and operative to provide output pulses on first and second output lines; an electronic pulse counter connected to said first and second output lines, the occurrence of a pulse on said first output line being operative to drive said counter additively and the occurrence of a pulse on said second output line being operative to drive said counter subtractively; and means varying in accordance with the signal-to-noise condition of said pair of phase-displaced electrical signals for providing said probable noise factor signals.

3. Apparatus according to claim 2 in which said means for providing said probable noise factor signal comprises voltage-deriving means mechanically connected to be varied as said movable element is moved to provide a probable noise factor signal which varies as a function of the optical path distance of light applied to said pair of photoelectric devices.

4. Apparatus according to claim 2 in which said means for providing said probable noise factor signal comprises a digital-to-analog converter connected to said electronic pulse counter and operable to provide a probable noise factor signal which varies as a function of the instantaneous count registered in said counter.

5. Apparatus according to claim 2 in which said means for providing said probable noise factor signal comprises means for measuring the amplitudes of said pair of phase-displaced electrial signals and for deriving a smoother probable noise factor signal commensurate with desired fractions of said amplitudes.

6. Apparatus for counting cycles of a pair of periodic phase-displaced electrical input signals having a phase relationship determinative of counting direction, comprising, in combination: amplitude selection means for deriving first and second control signals as the first of said input signals exceeds a threshold magnitude in a first sense and in a second sense, respectively; means for deriving third and fourth control signals as the second of said input signals exceeds a threshold magnitude in said first sense and in said second sense, respectively; a first "or" gate connected to receive said first and second control signals to invert its output signal to provide a fifth signal; a second "or" gate connected to receive said third and fourth control signals and to invert its output signal to provide a sixth signal; first and second "and" gates connected to receive said first and second control signals respectively and said fifth signal, thereby to provide first and third output pulse signals; and third and fourth "and" gates connected to receive said third and fourth control signals respectively and said sixth signal, thereby to provide second and fourth output pulse signals; said output signals thereby occurring in a first sequence or a second sequence throughout a cycle of said input signals depending upon the phase relationship between said phase-displaced input signals.

7. Apparatus according to claim 6 having a switching network connected to receive said output pulse signals and, depending upon the sequence of said pulse signals, to actuate a reversible electronic pulse counter.

8. Apparatus according to claim 6 having means responsive to a condition which varies as a function of the probable signal-to-noise ratio of said input signals for deriving a threshold signal, and means for connecting said threshold signal to said amplitude selection means.

9. Apparatus according to claim 6 in which a clock pulse input signal also is applied to each of said "and" gates.

10. Apparatus according to claim 7 in which said switching network comprises a plurality of gates connected to operate three bistable memory elements, thereby to provide three pairs of mutually inverse switching signals; a fifth "and" gate responsive to a first three of said switching signals and to at least one of said output pulse signals for providing "up" pulses on a first line; and a sixth "and" gate responsive to a second three of said switching signals and to at least one of said output pulse signals for providing "down" pulses on a second line; said electronic pulse counter being connected to said first and second lines.

11. An apparatus for improving the signal to noise ratio in an interferometric micrometer wherein a pair of phase-related signal voltages represent the quantity being measured and the phase angle between the first and second signals represents direction, comprising first and second amplifier means responsive to said first signal; said first amplifier means effective to provide a positive output signal only when said first signal is less than a first reference voltage; said second amplifier means effective to provide a positive output signal only when said first signal is greater than a second reference voltage, said second reference voltage being less than said first reference voltage; third and fourth amplifier means responsive to said second signal; said third amplifier means effective to provide a positive output signal only when said second signal is less than said first reference voltage; said fourth amplifier means effective to provide a positive output signal only when said second signal is greater than said second reference voltage; first buffer and inverting means responsive to said first and second amplifier means operable to provide an output signal when the magnitude of said first signal is intermediate the range defined by said first and second reference voltages; second buffer and inverting means operable to provide an output signal when the magnitude of said second signal is intermediate the range defined by said first and second reference voltages; and cross-correlating means coupled to said first, second, third, and fourth amplifier means and to said first and second buffer and inverting means effective to provide a first electrical representation when the phase of said first signal leads the phase of said second signal and to provide a second electrical representation when the phase of said first signal lags the phase of said second signal.

12. The apparatus of claim 11 wherein said first and second reference voltages are each proportional to the effective value of said first and second signals.

13. The apparatus of claim 12 wherein said first and second reference voltages are equal in magnitude but opposite in polarity.

14. The apparatus of claim 11 wherein said cross-correlating means includes means for combining the outputs of said first and second amplifier means together with the output of said second buffer and inverting means and the outputs of said third and fourth amplifier means together with the output of said first buffer and inverting means for sequentially energizing a plurality of output lines in accordance with the phase relationship between said first and second signals; and logical means coupled to all of said output lines for providing said first electrical representation only in response to a first energization sequence of said output lines and for providing said second electrical representation only in response to a second energization sequence of said output lines.

15. The apparatus of claim 14 wherein said second sequence is the reverse of said first sequence.

References Cited by the Examiner
UNITED STATES PATENTS

| | | | |
|---|---|---|---|
| 2,685,082 | 7/54 | Beman | 340—347.4 |
| 2,796,598 | 6/57 | Cartwright | 340—347.4 |
| 2,850,240 | 9/58 | Dickinson | 235—92 |
| 2,948,890 | 8/60 | Barth | 340—347.4 |

NEIL C. READ, *Primary Examiner.*
THOMAS B. HABECKER, *Examiner.*